United States Patent [19]

Lin et al.

[11] Patent Number: 5,531,818
[45] Date of Patent: Jul. 2, 1996

[54] INK JET INK COMPOSITIONS AND PRINTING PROCESSES

[75] Inventors: John W.-P. Lin, Webster; W. Conrad Richards, Marion, both of N.Y.

[73] Assignee: Xerox Corporation, Stamford, Conn.

[21] Appl. No.: 347,668

[22] Filed: Dec. 1, 1994

[51] Int. Cl.$^6$ .................................................. C09D 11/02
[52] U.S. Cl. ..................... 106/23 C; 106/23 R; 106/20 D
[58] Field of Search ................................ 106/23 R, 23 C, 106/20 C, 20 D

[56] References Cited

U.S. PATENT DOCUMENTS

| | | | |
|---|---|---|---|
| 3,687,887 | 8/1972 | Zabiak | 260/29.6 WB |
| 3,705,043 | 12/1972 | Zabiak | 106/20 |
| 4,273,847 | 6/1981 | Lennon et al. | 430/106 |
| 4,365,035 | 12/1982 | Zabiak | 106/23 C |
| 4,530,961 | 7/1985 | Nguyen et al. | 524/832 |
| 4,597,794 | 7/1986 | Ohta et al. | 106/20 |
| 4,657,591 | 4/1987 | Shioi et al. | 106/23 C |
| 4,681,632 | 7/1987 | Bes et al. | 106/23 C |
| 4,836,852 | 6/1989 | Knirsch et al. | 106/22 |
| 4,877,451 | 10/1989 | Winnik et al. | 106/23 |
| 5,026,427 | 6/1991 | Mitchell et al. | 106/23 |
| 5,085,698 | 2/1992 | Ma et al. | 106/20 |
| 5,106,417 | 4/1992 | Hauser et al. | 106/20 |
| 5,139,574 | 8/1992 | Winnik et al. | 106/22 |
| 5,145,518 | 9/1992 | Winnik et al. | 106/21 |
| 5,221,332 | 6/1993 | Kohlmeier | 106/20 C |
| 5,281,261 | 1/1994 | Lin | 106/20 R |

FOREIGN PATENT DOCUMENTS 9093765A 11/1982 Japan.

OTHER PUBLICATIONS

Xerox Disclosure Journal vol. 4 #1 Jan./Feb. 1979 "Waterproof Carbon Black Ink for Ink Jet Printing" Victor K. Dunn.

*Primary Examiner*—Helene Klemanski
*Attorney, Agent, or Firm*—Judith L. Byorick

[57] ABSTRACT

Disclosed is a thermal ink jet printing process which comprises (a) incorporating into a thermal ink jet printer an ink composition comprising water, a dye, and pigment particles having an average particle diameter of from about 0.001 micron to about 10 microns, said pigment particles being present in the ink in an amount of less than 0.1 percent by weight; and (b) causing droplets of the ink to be ejected in an imagewise pattern onto a recording medium by selectively heating the ink in the printer in an imagewise pattern, thereby generating images on the recording medium. The disclosed ink is capable of producing a large drop mass, high ink velocity, good directionality, and high quality images on plain papers with excellent long-term jetting stability.

23 Claims, 1 Drawing Sheet

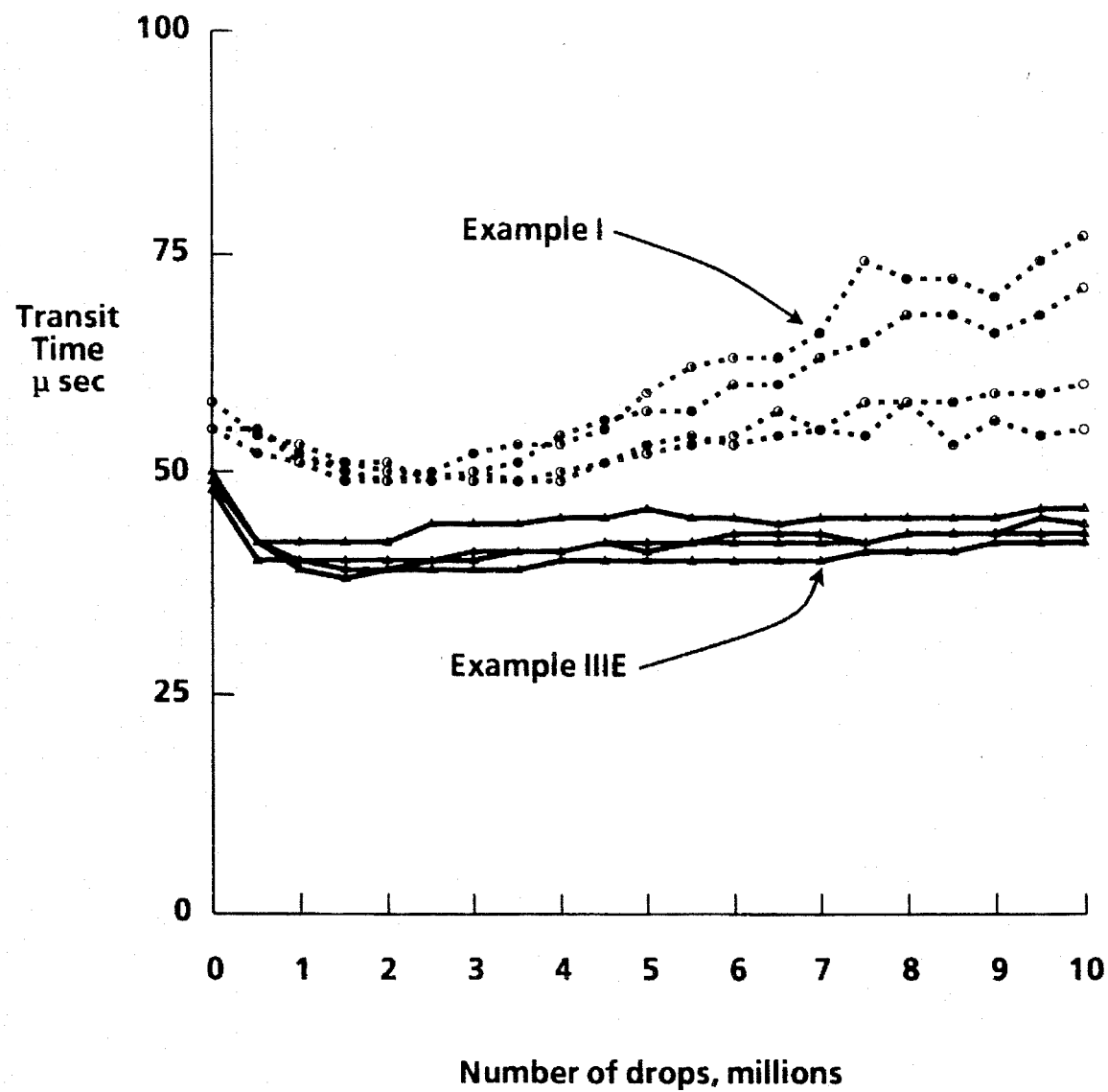

INK JET INK COMPOSITIONS AND PRINTING PROCESSES

BACKGROUND OF THE INVENTION

The present invention is directed to processes for ink jet printing. More specifically, the present invention is directed to ink jet printing processes employing an improved ink composition. One embodiment of the present invention is directed to a thermal ink jet printing process which comprises (a) incorporating into a thermal ink jet printer an ink composition comprising water, a dye, and pigment particles having an average particle diameter of from about 0.001 micron to about 10 microns, said pigment particles being present in the ink in an amount of less than 0.1 percent by weight; and (b) causing droplets of the ink to be ejected in an imagewise pattern onto a recording medium by selectively heating the ink in the printer in an imagewise pattern, thereby generating images on the recording medium.

Ink jet printing systems generally are of two types: continuous stream and drop-on-demand. In continuous stream ink jet systems, ink is emitted in a continuous stream under pressure through at least one orifice or nozzle. Multiple orifices or nozzles also can be used to increase imaging speed and throughput. The stream is ejected out of orifices and perturbed, causing it to break up into droplets at a fixed distance from the orifice. At the break-up point, the electrically charged ink droplets are passed through an applied electrode which is controlled and switched on and off in accordance with digital data signals. Charged ink droplets are passed through a controllable electric field which adjusts the trajectory of each droplet in order to direct it to either a gutter for ink deletion and recirculation or a specific location on a recording medium to create images. The image creation is controlled by electronic signals.

In drop-on-demand systems, a droplet is ejected from an orifice directly to a position on a recording medium by pressure created by, for example, a piezoelectric device, an acoustic device, or a thermal process controlled in accordance with digital data signals. An ink droplet is not generated and ejected through the nozzles of an imaging device unless it is needed to be placed on the recording medium.

Since drop-on-demand systems require no ink recovery, charging, or deflection operations, the system is simpler than the continuous stream type. There are three types of drop-on-demand ink jet systems. One type of drop-on-demand system has an ink filled channel or passageway having a nozzle on one end and a regulated piezoelectric transducer near the other end to produce pressure pulses. The relatively large size of the transducer prevents close spacing of the nozzles necessary for high resolution printing, and physical limitations of the transducer result in low ink drop velocity. Low drop velocity may seriously diminish tolerances for drop velocity variation and directionality, thus impacting the system's ability to produce high quality copies, and also decreases printing speed. Drop-on-demand systems which use piezoelectric devices to eject the ink droplets also suffer the disadvantage of a low resolution. A second type of drop-on-demand ink jet device is known as acoustic ink printing which can be operated at high frequency and high resolution. The printing utilizes a focused acoustic beam formed with a spherical lens illuminated by a plane wave of sound created by a piezoelectric transducer. The focused acoustic beam reflected from a surface exerts a pressure on the surface of the liquid, resulting in ejection of small droplets of ink onto an imaging substrate. Aqueous inks can be used in this system.

The third type of drop-on-demand system is known as thermal ink jet, or bubble jet, and produces high velocity droplets and allows very close spacing of nozzles. The major components of this type of drop-on-demand system are an ink filled channel having a nozzle on one end and a heat generating resistor near the nozzle. Printing signals representing digital information generate an electric current pulse in a resistive layer (resistor) within each ink passageway near the orifice or nozzle, causing the ink in the immediate vicinity of the resistor to be heated up periodically. Momentary heating of the ink leads to its evaporation almost instantaneously with the creation of a bubble. The ink at the orifice is forced out of the orifice as a propelled droplet at high speed as the bubble expands. When the hydrodynamic motion of the ink stops after discontinuous heating followed by cooling, the subsequent ink emitting process is ready to start all over again. With the introduction of a droplet ejection system based upon thermally generated bubbles, commonly referred to as the "bubble jet" system, the drop-on-demand ink jet printers provide simpler, lower cost devices than their continuous stream counterparts, and yet have substantially the same high speed printing capability.

The operating sequence of the bubble jet system begins with a current pulse through the resistive layer in the ink filled channel, the resistive layer being in close proximity to the orifice or nozzle for that channel. Heat is transferred from the resistor to the ink. The ink becomes superheated far above its normal boiling point, and for water based ink, finally reaches the critical temperature for bubble nucleation and formation of around 280° C. and above. Once nucleated and expanded, the bubble or water vapor thermally isolates the ink from the heater and no further heat can be applied to the ink. This bubble expands rapidly due to pressure increase upon heating until all the heat stored in the ink in excess of the normal boiling point diffuses away or is used to convert liquid to vapor, which removes heat due to heat of vaporization. The expansion of the bubble forces a droplet of ink out of the nozzle located either directly above or on the side of a heater, and once the excess heat is removed with diminishing pressure, the bubble collapses on the resistor. At this point, the resistor is no longer being heated because the current pulse has been terminated and, concurrently with the bubble collapse, the droplet is propelled at a high speed in a direction towards a recording medium. Subsequently, the ink channel refills by capillary action and is ready for the next repeating thermal ink jet process. This entire bubble formation and collapse sequence occurs in about 30 microseconds. The heater can be reheated to eject ink out of the channel after 100 to 2,000 microseconds minimum dwell time and to enable the channel to be refilled with ink without causing any dynamic refilling problem. Thermal ink jet processes are well known and are described in, for example, U.S. Pat. Nos. 4,601,777, 4,251,824, 4,410,899, 4,412,224, and 4,532,530, the disclosures of each of which are totally incorporated herein by reference.

Ink jet inks containing pigment particles as colorants are known. For example, in Dunn, "Waterproof Carbon Black Ink for Ink Jet Printing," Xerox Disclosure Journal, Vol. 4, No. 1 (1979), a waterproof colloidal carbon black ink for ink jet printing is disclosed. The ink is prepared by incorporating a water-resistant acrylic polymer binder into an ink jet ink, such that the ink composition comprises about 9 percent by weight of carbon black, about 2 percent by weight of an anionic polymer-type dispersing agent, about 5 percent by weight of polyethylene glycol, about 8 percent by weight of Carboset 514H, and about 76 percent by weight of ammoniated distilled water. Sufficient ammonium hydroxide is added to the ink to adjust the pH to 8.5. According to the article, this ink composition is particularly suited to ink jets run in a continuous mode.

U.S. Pat. No. 4,597,794 (Ohta et al.), the disclosure of which is totally incorporated herein by reference, discloses an ink jet recording process which comprises forming droplets of an ink and recording on an image receiving material by using the droplets, wherein the ink is prepared by dispersing fine particles of a pigment into an aqueous dispersion medium containing a polymer having both a hydrophilic and a hydrophobic construction portion. The hydrophilic portion constitutes a polymer of monomers having mainly additively polymerizable vinyl groups, into which hydrophilic construction portions such as carboxylic acid groups, sulfonic acid groups, sulfate groups, and the like are introduced. Pigment particle size may be from several microns to several hundred microns. The ink compositions disclosed may also include additives such as surfactants, salts, resins, and dyes.

U.S. Pat. No. 3,705,043 (Zabiak) discloses an ink suitable for jet printing which comprises a high infrared absorbing coloring component and a humectant in the form of an aliphatic polyol, alkyl ether derivatives of aliphatic polyols, and mixtures thereof in aqueous media. The infrared absorber component may be a high infrared absorptive water soluble dye, a solution of water dispersed carbon blacks, or mixtures thereof.

U.S. Pat. No. 3,687,887 (Zabiak) discloses an ink jet ink having application onto a film base which comprises an aqueous system containing 1 to 5 percent by weight of a dissolved styrene-maleic anhydride resin, 3 to 20 percent by weight of glycol ethers, and up to 4 percent by weight of carbon black in suspension or 1 to 4 percent of orthochromatic dyes in solution, or both, plus additives such as tinting dyes. Example 1 of this patent discloses a general ink formulation containing carbon black and a glycol ether, which may be an ethylene glycol type ether.

Japanese Patent 59-93765 discloses a recording liquid for ink jet printers. The ink disclosed therein is designed for dissolution stability at temperatures above 250° C. to prevent damage to the ink jet head, and comprises a dye, a solvent such as water, an organic solvent, an optional surface tension controller, a viscosity controller, and other additives. An amount of C.I. Food Black 2 is used as the colorant, and is present in the liquid in an amount of 0.5 to 15 percent by weight.

U.S. Pat. No. 4,273,847 (Lennon et al.) discloses a printing ink comprising particles of small size, each having a body portion consisting of a fusible resin with a colorant dispersed therein and an electrically conductive material, which may be carbon particles, situated substantially entirely on the surface of the body portion and comprising 5 to 10 percent of the weight of the ink. The disclosed ink is suitable for use in pulsed electrical printing.

U.S. Pat. No. 4,530,961 (Nguyen et al.) discloses an aqueous dispersion of carbon black grafted with hydrophilic monomers of alkali or ammonium carboxylate bearing polyacrylates, which suspension may be used for manufacturing ink jet inks. The dispersion has a viscosity of about 2 to about 30 centipoise for a carbon black content of about 1 to 15 percent by weight. This composition may also contain surfactants, wetting agents, dyes, mold inhibitors, oxygen absorbers, buffering agents, pH controlling agents, and viscosity controlling agents. Carbon black particles contained in the composition are of a size that permits them to pass easily through 1 to 50 micron mesh filters.

U.S. Pat. No. 4,877,451 (Winnik et al.), the disclosure of which is totally incorporated herein by reference, discloses ink jet ink compositions comprising water, a solvent, and a plurality of colored particles comprising hydrophilic porous silica particles to the surfaces of which dyes are covalently bonded through silane coupling agents.

U.S. Pat. No. 5,139,574 (Winnik et al.), the disclosure of which is totally incorporated herein by reference, discloses an ink composition which comprises an aqueous liquid vehicle, a water-soluble dye, and particles of a block copolymer of the formula ABA, wherein A represents a hydrophilic segment and B represents a hydrophobic segment, said ABA particles having an average diameter of about 300 Angstroms or less. The ink is particularly suitable for use in ink jet printing systems, especially thermal ink jet printing systems.

U.S. Pat. No. 5,145,518 (Winnik et al.), the disclosure of which is totally incorporated herein by reference, discloses an ink composition which comprises an aqueous liquid vehicle and particles of an average diameter of 100 nanometers or less which comprise micelles of block copolymers of the formula ABA, wherein A represents a hydrophilic segment and B represents a hydrophobic segment, and wherein dye molecules are covalently attached to the micelles, said dye molecules being detectable when exposed to radiation outside the visible wavelength range. Optionally, silica is precipitated within the micelles. In a specific embodiment, the dye molecules are substantially colorless. In another specific embodiment, the ink also contains a colorant detectable in the visible wavelength range.

U.S. Pat. No. 5,281,261 (Lin), the disclosure of which is totally incorporated herein by reference, discloses an ink composition comprising an aqueous liquid vehicle and pigment particles having attached to the surfaces thereof a polymerized vinyl aromatic salt.

U.S. Pat. No. 5,221,332 (Kohlmeier), the disclosure of which is totally incorporated herein by reference, discloses an ink composition which comprises an aqueous liquid vehicle, a colorant, and silica particles in an amount of from about 0.5 to about 5 percent by weight.

U.S. Pat. No. 4,836,852 (Knirsch et al.), the disclosure of which is totally incorporated herein by reference, discloses an ink formed by a solution of a direct dye in a mixture of water and glycol wetting agents, to which a pigment which is finely ground to particles of dimension of not more than 1000 Angstroms is added in dispersion, in a concentration of between 0.1 and 2 percent. The pigment particles serve to anchor the gaseous nuclei of gases which are dissolved in the ink for the purpose of stabilizing the boiling point of the ink. The ink is particularly suited to an ink jet printer of the type in which expulsion of the droplets is produced by causing instantaneous vaporization of a portion of ink in a nozzle.

U.S. Pat. No. 5,106,417 (Hauser et al.), the disclosure of which is totally incorporated herein by reference, discloses aqueous, low viscosity, stable printing ink compositions suitable for drop-on-demand ink jet printing containing specific selected amounts of a solid pigment preparation, a water-soluble organic solvent, a humectant and water so that the compositions resist clogging ink jet nozzles and give prints of excellent image resolution which are resistant to water and migration.

U.S. Pat. No. 5,085,698 (Ma et al.), the disclosure of which is totally incorporated herein by reference, discloses a pigmented ink for ink jet printers which comprises an aqueous carrier medium, and pigment particles dispersed in an AB or BAB block copolymer having a hydrophilic segment and a segment that links to the pigment. The A block and the 13 block(s) have molecular weights of at least 300. These inks give images having good print quality, water and smear resistance, lightfastness, and storage stability.

U.S. Pat. No. 5,026,427 (Mitchell et al.), the disclosure of which is totally incorporated herein by reference, discloses a process for the preparation of pigmented ink jet inks comprising: (a) mixing at least one pigment and at least one pigment dispersant in a dispersant medium to form a pigmented ink mixture wherein pigment is present in an amount up to 60% by weight based on the total weight of the mixture; (b) deflocculating the pigmented ink mixture by passing the pigmented ink mixture through at least a plurality of nozzles within a liquid jet interaction chamber at a liquid pressure of at least 1,000 psi to produce a substantially uniform dispersion of pigment particles in the dispersant medium.

While known compositions and processes are suitable for their intended purposes, a need remains for ink compositions particularly suitable for use in thermal ink jet printing processes. In addition, there is a need for ink compositions which, when employed in thermal ink jet printing processes, exhibit increased drop size, drop mass, and drop volume. Further, there is a need for ink compositions which, when employed in thermal ink jet printing processes, exhibit uniform drop speed over varying frequencies. Additionally, a need remains for ink compositions which, when employed in thermal ink jet printing processes, exhibit high ink drop velocity or short transit time. There is also a need for ink compositions which, when employed in thermal ink jet printing processes, exhibit a high jetting momentum, which is beneficial for printhead maintenance to clear clogging in the jet nozzles. In addition, there is a need for ink compositions which, when employed in thermal ink jet printing processes, exhibit large spot size and excellent optical density. Further, a need remains for ink compositions which, when employed in thermal ink jet printing processes, exhibit reduced misdirectionality of drops, thereby improving accuracy of ink placement on the recording medium. There is also a need for ink compositions which, when employed in thermal ink jet printing processes, exhibit improved print quality as a result of increased ink drop velocity. Additionally, there is a need for ink compositions which, when employed in thermal ink jet printing processes, exhibit stable long-term drop velocity and steady transit time.

SUMMARY OF THE INVENTION

It is an object of the present invention to provide ink jet compositions and processes with the above advantages.

It is another object of the present invention to provide ink compositions particularly suitable for use in thermal ink jet printing processes.

It is yet another object of the present invention to provide ink compositions which, when employed in thermal ink jet printing processes, exhibit increased drop size, drop mass, and drop volume.

It is still another object of the present invention to provide ink compositions which, when employed in thermal ink jet printing processes, exhibit uniform drop speed over varying frequencies.

Another object of the present invention is to provide ink compositions which, when employed in thermal ink jet printing processes, exhibit high ink drop velocity or short transit time.

Yet another object of the present invention is to provide ink compositions which, when employed in thermal ink jet printing processes, exhibit a high jetting momentum, which is beneficial for printhead maintenance to clear clogging in the jet nozzles.

Still another object of the present invention is to provide ink compositions which, when employed in thermal ink jet printing processes, exhibit large spot size and excellent optical density.

It is another object of the present invention to provide ink compositions which, when employed in thermal ink jet printing processes, exhibit reduced misdirectionality of drops, thereby improving accuracy of ink placement on the recording medium.

It is yet another object of the present invention to provide ink compositions which, when employed in thermal ink jet printing processes, exhibit improved print quality as a result of increased ink drop velocity.

It is still another object of the present invention to provide ink compositions which, when employed in thermal ink jet printing processes, exhibit stable long-term drop velocity and steady transit time.

These and other objects of the present invention (or specific embodiments thereof) can be achieved by providing a thermal ink jet printing process which comprises (a) incorporating into a thermal ink jet printer an ink composition comprising water, a dye, and pigment particles having an average particle diameter of from about 0.001 micron to about 10 microns, said pigment particles being present in the ink in an amount of less than 0.1 percent by weight; and (b) causing droplets of the ink to be ejected in an imagewise pattern onto a recording medium by selectively heating the ink in the printer in an imagewise pattern, thereby generating images on the recording medium.

BRIEF DESCRIPTION OF THE DRAWING

Illustrated schematically in FIG. 1 are test results showing transit time as a function of the number of drops jetted for an ink of the present invention when jetted from a thermal ink jet printhead.

DETAILED DESCRIPTION OF THE INVENTION

The liquid vehicle of the inks employed in the present invention can consist solely of water, or it can comprise a mixture of water and a water soluble or water miscible organic component, which typically functions as a humectant. Examples of suitable organic components include ethylene glycol, propylene glycol, diethylene glycol, glycerine, dipropylene glycol, polyethylene glycols, polypropylene glycols, trimethylolpropane, amides, including N,N-dimethylformamide and other aliphatic amides, cyclic amides such as N-methylpyrrolidone and 1-cyclohexyl- 2-pyrrolidone and the like, as well as aromatic amides, ethers, including dialkyl glycolethers and monoalkyl glycolethers, as well as amine derivatives such as morpholine, trimethylamine, triethylamine, dibutylamine, N,N-bis(3-aminopropyl) ethylenediamine, dialkylamines, piperidine, pyridine, and the like, carboxylic acids and their salts, esters, alcohols, including 1-propanol, 1-butanol, benzyl alcohol, phenol derivatives, and the like, organosulfides, organosulfoxides, including dimethyl sulfoxide, dialkylsulfoxides, sulfones, diarkylsulfones, sulofane, and the like, alcohol derivatives, hydroxyether derivatives such as carbitols (including 2-(2-butoxyethoxy)ethanol, 2-(2-ethoxyethoxy)ethanol, 2-(2- methoxyethoxy)ethanol, 2-(2-propoxyethoxy)ethanol), propylene glycol monomethyl ether, propylene glycol monoethyl ether, propylene glycol monobutyl ether, and the like, cellusolves, such as 2-butoxyethanol and 2-pentoxyethanol, amino alcohols, including diethanolamine, triethanolamine, and the like, ketones, polyelectrolytes, urea derivatives, and other water soluble or water miscible materials, as well as mixtures thereof. When mixtures of water and water soluble or miscible organic components are selected as the liquid vehicle, the water to organic ratio typically ranges from about 100:0 to about 40:60, and preferably from about 97:3 to about 50:50. The non-water component of the liquid vehicle generally serves as a humectant which has a boiling point usually higher than that of water (100° C.). In the ink compositions for the present invention, the liquid vehicle is typically present in an amount of from about 80 to about 99.9 percent by weight of the ink, and preferably from about 90 to about 99 percent by weight of the ink, although the amount can be outside these ranges.

The ink composition also contains a dye colorant. Any suitable dye or mixture of dyes compatible with the ink liquid vehicle can be used, with water soluble anionic dyes and cationic dyes being preferred. Examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61,63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), anthraquinone dyes, monoazo dyes, disazo dyes, phthalocyanine derivatives, including various phthalocyanine sulfonate salts, aza [18] annulenes, formazan copper complexes, triphenodioxazines, Bernacid Red 2BMN; Pontamine Brilliant Bond Blue A; Pontamine; Caro direct Turquoise FBL Supra Conc. (Direct Blue 199), available from Carolina Color and Chemical; Special Fast Turquoise 8GL Liquid (Direct Blue 86), available from Mobay Chemical; Intrabond Liquid Turquoise GLL (Direct Blue 86), available from Crompton and Knowles; Cibracron Brilliant Red 38-A (Reactive Red 4), available from Aldrich Chemical; Drimarene Brilliant Red X-2B (Reactive Red 56), available from Pylam, Inc.; Levafix Brilliant Red E-4B, available from Mobay Chemical; Levafix Brilliant Red E-6BA, available from Mobay Chemical; Procion Red H8B (Reactive Red 31), available from ICI America; Pylam Certified D&C Red #28 (Acid Red 92), available from Pylam; Direct Brilliant Pink B Ground Crude, available from Crompton & Knowles; Cartasol Yellow GTF Presscake, available from Sandoz, Inc.; Tartrazine Extra Conc. (FD&C Yellow #5, Acid Yellow 23), available from Sandoz; Carodirect Yellow RL (Direct Yellow 86), available from Carolina Color and Chemical; Cartasol Yellow GTF Liquid Special 110, available from Sandoz, Inc.; D&C Yellow #10 (Acid Yellow 3), available from Tricon; Yellow Shade 16948, available from Tricon, Basacid Black X34, available from BASF, Carta Black 2GT, available from Sandoz, Inc.; Neozapon Red 492 (BASF); Orasol Red G (Ciba-Geigy); Direct Brilliant Pink B (Crompton-Knolls); Aizen Spilon Red C-BH (Hodogaya Chemical Company); Kayanol Red 3BL (Nippon Kayaku Company); Levanol Brilliant Red 3BW (Mobay Chemical Company); Levaderm Lemon Yellow (Mobay Chemical Company); Spirit Fast Yellow 3G; Aizen Spilon Yellow C-GNH (Hodogaya Chemical Company); Sirius Supra Yellow GD 167; Cartasol Brilliant Yellow 4GF (Sandoz); Pergasol Yellow CGP (Ciba-Geigy); Orasol Black RL (Ciba-Geigy); Orasol Black RLP (Ciba-Geigy); Savinyl Black RLS (Sandoz); Dermacarbon 2GT (Sandoz); Pyrazol Black BG (ICI); Morfast Black Conc A (Morton-Thiokol); Diazol Black RN Quad (ICI); Orasol Blue GN (Ciba-Geigy); Savinyl Blue GLS (Sandoz); Luxol Blue MBSN (Morton-Thiokol); Sevron Blue 5GMF (ICI); Basacid Blue 750 (BASF); Bernacid Red, available from Berncolors, Poughkeepsie, N.Y.; Pontamine Brilliant Bond Blue; Berncolor A. Y. 34; Telon Fast Yellow 4GL-175; BASF Basacid Black SE 0228; the Pro-Jet® series of dyes available from ICI, including Pro-Jet® Yellow I (Direct Yellow 86), Pro-Jet® Magenta I (Acid Red 249), Pro-Jet® Cyan I (Direct Blue 199), Pro-Jet® Black I (Direct Black 168), Pro-Jet® Yellow 1-G (Direct Yellow 132), Aminyl Brilliant Red F-B, available from Sumitomo Chemical Company (Japan), the Duasyn® line of "salt-free" dyes available from Hoechst, such as Duasyn® Direct Black HEF-SF (Direct Black 168), Duasyn® Black RL-SF (Reactive Black 31), Duasyn® Direct Yellow 6G-SF VP216 (Direct Yellow 157), Duasyn® Brilliant Yellow GL-SF VP220 (Reactive Yellow 37), Duasyn® Acid Yellow XX-SF LP413 (Acid Yellow 23), Duasyn® Brilliant Red F3B-SF VP218 (Reactive Red 180), Duasyn® Rhodamine B-SF VP353 (Acid Red 52), Duasyn® Direct Turquoise Blue FRL-SF VP368 (Direct Blue 199), Duasyn® Acid Blue AE-SF VP344 (Acid Blue 9), various Reactive dyes, including Reactive Black dyes, Reactive Blue dyes, Reactive Red dyes, Reactive Yellow dyes, and the like, as well as mixtures thereof. The dye is present in the ink composition in any effective amount, typically from about 0.5 to about 15 percent by weight, and preferably from about 1 to about 10 percent by weight, and more preferably from about 1 to about 6 percent by weight, although the amount can be outside of these ranges.

Also contained in the ink composition of the present invention are pigment particles. The pigment can be of any desired color, such as black, cyan, magenta, yellow, red, blue, green, brown, or the like, as well as mixtures thereof. Preferably, the color of the pigment particles either is similar to or the same as the color of the selected dye, or does not interfere with or impair the desired color of the final ink. Examples of suitable pigments include various carbon blacks such as channel black, furnace black, lamp black, Raven®5250, Raven®5750, Raven®3500 and other similar carbon black products available from Columbia Company, Regal®330, Black Pearl® L, Black Pearl®1300, and other similar carbon black products available from Cabot Company, Degussa carbon blacks such as Color Black® series, Special Black® series, Printtex® series and Derussol® carbon black dispersions available from Degussa Company, Hostafine® series such as Hostafine® Yellow GR (Pigment 13), Hostafine® Yellow (Pigment 83), Hostafine® Red FRLL (Pigment Red 9), Hostafine® Rubine F6B (Pigment 184), Hostafine® Blue 2G (Pigment Blue 15:3), Hostafine® Black T (Pigment Black 7), and Hostafine® Black TS (Pigment Black 7), available from Hoechst Celanese Corporation, Normandy Magenta RD-2400 (Paul Uhlich), Paliogen Violet 5100 (BASF), Paliogen Violet 5890

(BASF), Permanent Violet VT2645 (Paul Uhlich), Heliogen Green L8730 (BASF), Argyle Green XP-111-S (Paul Uhlich), Brilliant Green Toner GR 0991 (Paul Uhlich), Heliogen Blue L6900, L7020 (BASF), Heliogen Blue D6840, D7080 (BASF), Sudan Blue OS (BASF), PV Fast Blue B2G01 (American Hoechst), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Novoperm Yellow FG 1 (Hoechst), Permanent Yellow YE 0305 (Paul Uhlich), Lumogen Yellow D0790 (BASF), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E. D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), and Lithol Fast Scarlet L4300 (BASF). Other pigments can also be selected. Particularly preferred pigment particles are nonmutagenic and nontoxic carbon black particles with a polyaromatic hydrocarbon content of less than about 1 part per million. The pigment particles may be used in their commercially available forms, such as stabilized aqueous pigment dispersions, and need not be treated or modified with dispersing agents or other materials. However, if desired, a dispersing agent, dispersant, surfactant, or wetting agent can also be employed to modify the pigment dispersions further to enhance the colloidal stability of the pigment in the ink. If a pigment is not previously treated by a dispersing agent or by chemical bonding with a component (chemically modified or grafted pigment) which is hydrophilic for effectively dispersing the pigment in an aqueous system, such as a sulfonic acid salt, a phosphoric acid salt, a carboxylic acid salt, or the like, as described in, for example, U.S. Pat. No. 5,281,261, the disclosure of which is totally incorporated herein by reference, treatment of the pigment with a dispersing agent may be needed for the pigment particles to be dispersed effectively in an aqueous ink system without settling or coagulation.

A pigment dispersion can be prepared by, for example, treating pigment particles with a particle size reduction process which utilizes ball milling, homogenization, sonification, or a combination thereof in the presence of water and, if desired, at least one dispersing agent. The dispersing agent or agents can be nonionic, anionic, cationic, or amphoteric, or a combination thereof. Suitable dispersing agents, surfactants, and wetting agents include Igepal® series surfactants, alkyl or dialkyl phenoxy poly(ethyleneoxy)ethanol derivatives including Igepal® CA630, Igepal® CA-720, Igepal® CO-720, Igepal® CO-890, Igepal® CA-897, Igepal® CO-970, Igepal®DM-970, all available from Rhone-Poulenc Company, copolymers of naphthalene sulfonic salts and formaldehyde, including Daxad® 11, Daxad® 11 KLS, Daxad® 19, Daxad® 19K, and the like, all available from W. R. Grace & Company, the Lomar® series (including Lomar® D and the like), available from Diamond Shamrock Corporation, the Tamol series (including Tamol® SN and the like), available from Rohm and Haas Company, the Triton® series (including Triton® X-100, Triton® X-102, Triton® X-114, Triton® CF 21, Triton® CF 10, and the like), all available from Rohm and Haas Company, Duponol® ME Dry, Duponol® WN, Merpol® RA, Merpol® SE, Merpol® SH, Merpol® A, Zelec® NK, and the like, all available from E. I. Du Pont de Nemours & Company, the Tergitol® series, available from Union Carbide Company, the Surfynol® series (GA, TG, 465H, CT-136, and the like), available from Air Products and Chemicals Co., copolymers of styrene and maleic acid salts, such as those available from Alco Chemical Inc., polyacrylate derivatives, copolymers of acrylic monomers or methacrylic monomers and their salts, polystyrenesulfonate salts, and the like, as well as mixtures thereof. The dispersing agent is typically present in an amount of from about 0.1 to about 150 percent by weight of the pigment, and preferably from about 1 to about 100 percent by weight of the pigment, although the amount can be outside these ranges.

The pigment particles typically have an average particle diameter of from about 0.001 micron (1 nanometer) to about 10 microns, preferably from about 0.01 micron (10 nanometers) to about 3 microns, although the particle size can be outside this range. Reduction of pigment particle size can be achieved by various processes, such as ball milling, roll milling, paintshaking, mechanical attrition, microfluidization in a liquid jet interaction chamber at a high liquid pressure, sonification, precipitation, acid pasting, and the like. It is preferred to reduce the size of the pigment particles in the presence of water and a dispersing agent for the preparation of a pigment dispersion. The pigment particles treated with the dispersing agent form a stable colloidal pigment dispersion. The pigment dispersion can then be used to prepare a pigmented ink in an aqueous medium comprising a liquid vehicle, the pigment dispersion, and any additional desired ink additives. If necessary, additional steps of centrifugation and filtration can be carried out to assure the maintainenance of good pigment particle size in the ink after mixing the ink ingredients together. The ink or the pigment dispersion (higher pigment concentration) can then be admixed with a dye. The pigment particles can be added to an ink jet ink which comprises water, a dye, an optional humectant, an optional biocide, an optional pH buffer agent, an optional chelating agent, an optional penetrant or drying accelerating agent for decreasing drying time, an optional antioxidant, an optional anticlogging agent, and an optional monomeric or polymeric additive with thorough mixing. If necessary, a filtration process can be carried out to remove large or unstable pigment particles. Alternatively, pigment particles which are prepared by a chemical modification method or a grafting technique for providing needed hydrophilicity can also be employed. These modified or grafted pigment particles usually comprise a copolymer or polymer which contains either an ionizable component in water or a water miscible component to provide good colloidal stability in an aqueous ink.

The pigment particles are present in the ink in an amount of less than about 0.1 percent by weight of the ink, preferably from about 1 part per billion (0.0000001 percent) by weight to about 900 parts per million (0.09 percent) by weight, and more preferably from about 1 part per billion (0.0000001 percent) by weight to about 750 parts per million (0.075 percent) by weight of the ink.

Polymeric additives can also be added to the inks of the present invention to enhance the viscosity of the ink composition and provide any other desired functions. Water soluble polymers such as Gum Arabic, polyacrylate salts, polymethacrylate salts, polyvinyl alcohols, polyethylene oxides, poyethylene glycols, polypropylene glycols, hydroxypropylcellulose, hydroxyethylcellulose, polyvinylpyrrolidinone, polyvinylether, starch, polyacrylamide, copolymers of naphthalene sulfonate salts and formaldehyde, polysaccharides, and the like are particularly useful for stabilizing pigment particles in a water based liquid vehicle such as water or a mixture of water and a water soluble organic component. Polymeric additives, if present, can be present in the ink composition of the present invention in any effective amount, typically from 0 to about 5 percent by weight of the ink, and preferably from about 0.001 to about 3 percent by weight of the ink, although the amount can be outside these ranges.

Other optional additives to the ink composition of the present invention include biocides, such as Dowicil® 150, 200, and 75, Omidines® (Olin Company), benzoate salts, sorbate salts, and the like, typically present in an amount of from about 0.0001 to about 4 percent by weight, and preferably from about 0.01 to about 2.0 percent by weight, although the amount can be outside these ranges, antioxidants, including derivatives of phenols such as BHT, 2,6-di-t-butylphenol, and the like, tocopherol derivatives such as Vitamin E and the like, aromatic amines, alkyl and aromatic sulfides, and the like, typically present in an amount of from 0 to about 10 percent by weight, and preferably from 0 to about 5 percent by weight, although the amount can be outside these ranges, pH controlling agents, including acids such as acetic acid, phosphoric acid, boric acid, sulfuric acid, nitric acid, hydrochloric acid, and the like, bases such as potassium hydroxide, sodium hydroxide, lithium hydroxide, ammonium hydroxide, trimethylamine, ethanolamine, morpholine, triethanolamine, diethanolamine, and the like, phosphate salts, carboxylate salts, sulfite salts, amine salts, and the like, typically present in an amount of from 0 to about 10 percent by weight, and preferably from about 0.001 to about 5 percent by weight, although the amount can be outside these ranges, drying accelerating agents, such as sodium lauryl sulfate, N,N-diethyl-m-toluamide, cyclohexylpyrrolidinone, butylcarbitol, benzyl alcohol, polyglycol ethers, and the like, typically present in an amount of from about 0.001 to about 25 percent by weight, and preferably from about 0.01 to about 3 percent by weight, although the amount can be outside these ranges, surface tension modifiers, including surfactants such as sodium lauryl sulfate, sodium dodecyl sulfate, sodium octyl sulfate, Igepal® CO-630, Igepal® CO-530, Igepal® CA-630, Igepal® CA-530, and the like, typically present in an amount of from 0 to about 10 percent by weight, and preferably from 0 to about 5 percent by weight, although the amount can be outside these ranges, ink penetrants, such as alcohols, including isopropanol, butyl alcohol, and the like, sodium lauryl sulfate, esters, ketones, polyethylene glycol ether derivatives, N-methylpyrrolidone, and the like, typically present in an amount of from about 0.001 to about 15 percent by weight, and preferably from about 0.001 to about 10 percent by weight, although the amount can be outside these ranges, chelating agents, including EDTA (ethylene diamine tetraacetic acid), HEEDTA (N-(hydroxyethyl) ethylenediaminetriacetate), NTA (nitriloacetate), DTPA (diethylenetriaminepentaacetic acid), and the like, as well as their salts, typically present in an amount of from about 0.001 to about 5 percent by weight, and preferably from about 0.001 to about 2 percent by weight, although the amount can be outside these ranges, and additives for improving waterfastness and lightfastness, such as polyethyleneimine, ethylene and propylene oxide modified polyethyleneimine, and the like, typically present in an amount of from 0 to about 10 percent by weight, and preferably from 0 to about 5 percent by weight, although the amount can be outside these ranges.

The viscosity of the ink typically is from about 1 to about 10 centipoise (measured at 25° C.) and preferably is less than about 4 centipoise, although the viscosity can be outside these ranges.

The ink jet inks of the present invention can be formulated to have either slow drying or fast drying characteristics on plain papers. The slow drying inks typically have a drying time greater than about 1 second, whereas the fast drying inks typically have a drying time of less than about 1 second. The surface tension of an ink of the present invention typically has a range of from about 26 to about 72 dynes per centimeter at 23° C., although the surface tension can be outside this range. The surface tension of a slow drying ink at 23° C. typically is equal to or greater than about 45 dynes per centimeter, and the surface tension of a fast drying ink at 23° C. typically is lower than about 45 dynes per centimeter. During the printing process, a heating means, such as a heated platen, a heated drum, a heated belt, a heated lamp, a microwave dryer, or the like can be used, if desired, to heat the recording medium (substrate or sheet) at any desired printing stages such as before printing, during printing, after printing, or some combination thereof to increase ink drying rates and to avoid ink smearing and intercolor bleeding. The recording medium usually is a plain paper, a coated paper, or an ink jet transparency, although other media can also be employed.

Generally, it is preferred to formulate the inks of the present invention to exhibit a reasonable level of resistivity or conductivity. Highly conductive ink jet inks can cause unwanted or premature heater damage, corrosion, ink instability, and nozzle clogging in a printhead. For these reasons, the resistivity of the inks of the present invention is preferably greater than about 142.86 Ohm-cm at room temperature. The conductivity of the ink containing a small amount of pigment particles is preferred to be less than about 7000 microMho/cm (or 0.007000 $(Ohm\text{-}cm)^{-1}$) at room temperature.

Inks of the present invention can be prepared by any process suitable for preparing aqueous inks. An ink of the present invention can be prepared by thoroughly admixing water, an optional organic component (e.g. humectant), a pigment or pigment dispersion, an optional dispersant, an optional biocide, and any other desired optional additives. It is preferred, but not necessary, to prepare two inks of identical composition except that one contains a pigment and one contains a dye. The addition of a small amount of pigmented ink to the dye-based ink will not cause a significant change in the overall composition of the dye-based ink (except for a small change in the dye concentration) in the modification process. Also, in this way pigment particles in the pigmented ink will not experience a colloidal shock or instability when they are added to the dye-based ink of similar composition. The pigmented ink can be added slowly to the dye-based ink in the desired relative amounts with thorough mixing and stirring until a uniform ink composition results (typically about 30 minutes, although the mixing/stirring time can be either greater or less than this period). While not required, the ink ingredients can be heated during mixing or stirring if desired. Subsequent to mixing and stirring, the ink composition can be used either with or without filtration.

The process of the present invention can be employed with a wide variety of recording media, including plain papers such as Xerox® 4024 papers, including Ashdown 4024 DP, Cortland 4024 DP, Champion 4024 DP, Xerox® 4024 D.P. green, Xerox® 4024 D.P. pink, Xerox® 4024 D.P yellow, and the like, Xerox® 4200 papers, Xerox® 10 series paper, Xerox® Imaging Series LX paper, canary ruled paper, ruled notebook paper, bond paper such as Gilbert 25 percent cotton bond paper, Gilbert 100 percent cotton bond paper, and Strathmore bond paper, recycled papers, silica coated papers such as Sharp Company silica coated paper, JuJo® paper, glossy papers, and the like, transparency materials such as Xerox® 3R3351 ink jet transparencies, Tetronix ink jet transparencies, Arkright ink jet transparencies, Hewlett-Packard ink jet transparencies, and the like, fabrics, textile products, plastics, polymeric films, inorganic substrates such as metals and wood, and the like.

The jetting performance of the ink jet inks of the present invention were tested with either a 300 SPI (300 dpi) or 400 SPI (400 dpi) printhead with a 3 microsecond pulse length at a frequency of 1 KHz. The operating voltage for the printhead was held in a range of from 30 to 50 volts. The operating voltage generally was about 10 percent over the threshold voltage (minimum voltage needed to cause ejection of an ink droplet) of the printhead and the exact operating voltage used for the printhead in each instance depended on the ink and the type of printhead used. Ink drop mass (related to drop volume), transit time for a drop of ink travelling to a distance of 0.5 mm (related to drop velocity), and jetting stability were measured. The ink drop mass was determined by measuring the weight of collected ink divided by the number of drops of ink jetted. Ink velocity was calculated from the transit time data with the following formula (0.0005 meter/transit time). Thus, for an ink with a transit time of 50 microseconds, the ink drop velocity is 10 meters per second. A fast ink drop velocity (or short transit time over a fixed distance) usually results in accurate placement of the ink on a recording medium or substrate and a reduced directionality problem. A jetted ink with a large momentum (mass times velocity) enables easier removal of a solid or a viscous liquid plug near the orifice of an ink jet printhead, thus improving jetting efficiency and avoiding missing jets or misdirectionality problems. A large drop mass or drop volume of the jetted ink tends to produce a large spot on a recording medium to give high optical density and good image quality. For ink jet printing with a resolution of 300 SPI, a drop mass of about 140±20 nanograms per drop may be desired for a black ink to enable good optical density on a plain paper.

The ink of the present invention comprises a small amount of pigment particles well dispersed in an ink jet ink containing a dye. The pigment particles can be deposited uniformly onto a heater of a printhead and improve the nucleation, evaporation, and bubble formation of the ink ingredients, particularly the water (B.P.=100° C.), during thermal ink jet printing processes. The ink of the present invention exhibits an increase in drop mass (drop volume), drop velocity (short transit time), and long-term jetting stability for ink velocity (or transit time) compared to dye-based inks of similar composition but containing no pigment particles. As a result, the ink of the present invention enables proper placement on the recording medium with large spot size and very good optical density, and reduces misdirectionarity problems. Furthermore, upon jetting, the ink of the present invention possesses a large momentum, which can facilitate the removal of possible ink clogging near the nozzles of the printhead, and thus improves printhead maintenance efficiency. Also, long-term jetting stability (drop velocity, drop mass, and the like) are improved for the inks of the present invention, and the inks allow a printhead to function properly over a long period of time with good jetting performance.

The inks of the present invention can, if desired, be employed in a thermal ink jet printhead comprising multiple heaters and nozzles (for example, 48 jets, 128 jets, 192 jets, 256 jets, or the like) for printing on a recording medium with good image resolution of, for example, from 200 to 800 spots per inch. The multiple jet printheads can also be butted together in a series to form a printhead (full-width array printhead) capable of printing the ink imagewise on a recording medium at a faster speed than conventional (e.g. linewise printing) printheads.

Specific embodiments of the invention will now be described in detail. These examples are intended to be illustrative, and the invention is not limited to the materials, conditions, or process parameters set forth in these embodiments. All parts and percentages are by weight unless otherwise indicated.

EXAMPLE I (COMPARATIVE)

A black ink was prepared by admixing BASF X-34 dye (40.32 grams dye concentrate containing 12.096 grams dye solids), ethylene glycol (70.0 grams), isopropanol (12.35 grams), Dowicil 200 biocide (0.35 gram), and distilled water (226.98 grams). The pH of the ink was adjusted to 7.0. The ink was then filtered through 5.0 and 1.2 micron filters. The surface tension of the ink was 48.8 dynes per centimeter and the viscosity of the ink at room temperature was 2.0 centipoises. The conductivity of the ink at room temperature was 0.0035 $(ohm-cm)^{-1}$.

EXAMPLE II

A carbon black pigment dispersion was prepared by adding Raven® 5250 carbon black (60 grams), Lomar® D solution (15 grams of Lomar® D in 60 grams of water), and distilled water (175 grams) to an attritor (O1 size from Union process Inc.) containing 1500 grams of stainless steel shots and milling for 30 minutes. After removing most of the carbon black dispersion from the attritor, additional water was added to the attritor in three portions (3×25 grams of distilled water) with mixing to repeatedly extract more carbon black dispersion from the attritor. All carbon black dispersions were combined to form a homogeneous pigment dispersion (353.76 grams, 16.86 percent by weight carbon black).

A carbon black ink was then prepared by thorough admixing of the above carbon black dispersion (74.14 grams), distilled water (116.8 grams), Dowicil 200 (0.25 gram), isopropanol (8.75 grams), and ethylene glycol (50.0 grams). The mixture was adjusted to pH=7.8, sonified, and centrifuged (7000 RPM). Liquid carbon black ink was then separated from unsuspended solid residue and filtered through a series of filters with pore sizes of 5.0 microns, 3.0 microns, and 1.2 microns. The resulting ink contained about 4.3 percent by weight carbon black with a particle size of less than 1.2 microns. The surface tension and viscosity of the ink at room temperature was dynes per centimeter and the viscosity at room temperature was 2.22 centipoises. The conductivity of the ink was 0.0050 $(ohm-cm)^{-1}$.

EXAMPLE III

Several inks were prepared comprising a dye and different concentrations of pigment particles. Different amounts of the dye-based ink (Example I) and the pigmented ink (Example II) were weighed and thoroughly mixed to yield ink jet inks containing a) 0.025 percent by weight carbon black (Example IIIA); b) 0.05 percent by weight carbon black (Example IIIB); c) 0.075 percent by weight carbon black (Example IIIC); d) 0.09997 percent by weight carbon black (Example IIID); and e) 0.04 percent by weight carbon black (Example IIIE). All of the inks in Example III (A to E) were of similar composition except for the level of pigment concentration. All of the inks exhibited surface tensions in the range of 48.5 to 50.1 dynes per centimeter at room temperature, viscosities of from 2.0 to 2.3 centipoises at room temperature, and conductivities of less than 0.0045 $(\text{Ohm-cm})^{-1}$ The transit times for ink droplets to travel a distance of 0.5 millimeter were 80 microseconds or more for the unmodified ink (Example I) and 58 microseconds or less for the modified inks (Examples IIIA, B, C, D, and E). These results demonstrate that the modified inks jetted at a higher velocity than the unmodified ink. Further data for the unmodified and modified inks is provided in Table I, showing increased drop mass data of modified dye inks containing pigment particles. Ink IIIE was also used in the long-term jetting stability test (Example V).

| Ink | amount of pigmented ink of Example II (grams) | amount of dye-based ink of Example I (grams) | % by wt. pigment in ink | drop mass (nanograms per drop) |
| --- | --- | --- | --- | --- |
| I | 0.0 | 60.0 | 0 | 94–115 |
| IIIA | 0.350 | 59.65 | 0.025 | 148 |
| IIIB | 0.702 | 59.36 | 0.050 | 149 |
| IIIC | 1.048 | 58.96 | 0.075 | 155 |
| IIID | 1.390 | 58.61 | 0.0999 | 156 |

Testing printhead was 300 SPI operated at 38 volts with a 3 microsecond pulse length at room temperature.

EXAMPLE IV

Additional inks were prepared by admixing the ink of Example I with the ink of Example II in varying amounts to yield inks containing a) 25 ppm carbon black (0.0025 percent by weight, Example IVA); b) 50 ppm carbon black (0.0050 percent by weight, Example IVB); and c) 100 ppm carbon black (0.0100 percent by weight, Example IVC). All of the inks exhibited conductivities of less than 0.0045 $(\text{Ohm-cm})^{-1}$. A 300 SPI printhead was employed for the jetting test to measure the average drop mass per drop of ink. All of the inks (Examples IV A, B, and C) exhibited larger drop mass than the ink of Example I. Some of the results are shown below in Table II, showing the effect of a small amount of pigment particles on drop mass in dye-based inks.

| Ink | pigment concentration (ppm) | drop mass (nanograms per drop) | increase in drop mass (nanograms per drop) |
| --- | --- | --- | --- |
| I | 0 | 96 | 0 |
| IVA | 25 | 102 | 8 |
| IVB | 50 | 107 | 11 |
| IVC | 100 | 120 | 24 |

EXAMPLE V

The inks of Example I and Example IIIE were tested for long-term jetting stability with a 400 SPI printhead which was operated at 41 volts with a 3 microsecond pulse length. The results are shown in FIG. I, which shows transit time data (time for a travelling distance of 0.5 millimeters) as a function of number of jetting drops for the ink of Example (containing no pigment particles) and Example IIIE (containing 0.04% pigment particles). As the data in FIG. I indicate, the ink according to the present invention exhibits better long-term jetting stability and drop velocity (steady and shorter transit time with faster drop velocity) compared to the ink of Example I for up to at least $1\times1^7$ pulses. In addition, the ink of the present invention also yielded larger ink drop mass or drop volume than the ink of Example I.

EXAMPLE VI

A pigment dispersion was prepared as described in Example II except Lomar D (an anionic dispersant, 15 grams) was replaced with Igepal CO-890 (a nonionic dispersant, 18 grams). The fabricated pigment dispersion (361 grams) contained 15.39 percent by weight carbon black. A pigmented ink was then prepared by thoroughly admixing the pigment dispersion (97.53 grams), distilled water (131.67 grams), ethylene glycol (60.0 grams), Dowicil 200 (0.3 gram), and isopropanol (10.5 grams) with sonification. The ink mixture was adjusted to pH=7.37 and centrifuged at a speed of 10,000 RPM, followed by filtration with a series of filters with sizes of 5.0 microns, 3.0 microns, and 0.65 micron to yield a pigmented ink containing 20 percent by weight ethylene glycol, 3.5 percent by weight isopropanol, 4.02 percent by weight carbon black pigment particles, 0.1 percent by weight Dowicil 200, and distilled water (balance).

EXAMPLE VII

An ink was prepared by admixing the dye-based ink of Example I (99.004 grams) and the pigmented ink of Example VI (0.996 gram) to yield an ink containing 0.04 percent by weight carbon black pigment. The ink had the following physical properties at room temperature (23° C.): pH=7.48, viscosity=2.3 centipoises, conductivity=0.0040 $(\text{Ohm-cm})^{-1}$, and surface tension 47.2 dynes per centimeter. The ink was tested with a 300 SPI thermal ink jet printhead and exhibited a drop mass of 145 nanograms per drop, compared to a drop mass of 94 nanograms per drop for the ink of Example I.

EXAMPLE VIII

A pigmented ink was prepared by thoroughly admixing Hostafine Black TS black pigment (obtained from Hoechst Celanese Corporation, 45.45 grams), ethylene glycol (60.0 grams), isopropanol (10.5 grams), Dowicil 200 (0.3 grams), and distilled water (183.75 grams). The ink was adjusted for pH, centrifuged, and filtered with 5.0 micron, 1.2 micron, and 0.65 micron membrane filters. The pigmented ink thus prepared contained 6.0 percent by weight solids. The aforementioned pigmented ink (0.523 gram) was added to the dye-based ink of Example I (99.497 grams) with thorough mixing to yield an ink containing 0.0314 percent by weight solids (including carbon black and dispersing agent). The ink thus prepared exhibited the following physical properties: surface tension=47.2 dynes per centimeter, pH=7.48, conductivity=4100 $(\text{microOhm-cm})^{-1}$, and viscosity=2.3 centipoises. The ink had a drop mass of 104 nanograms per drop, which is larger than the drop mass of the ink of Example I (94 nanograms per drop).

EXAMPLE IX

The dye-based ink of Example I (79.25 grams) was admixed with the pigmented ink of Example II (0.744 gram) to yield an ink containing 0.04 percent by weight pigment particles. The ink thus prepared (60 grams) was placed in an ink cartridge with a 128 jet printhead, polyester felts, a scavenger consisting of polyurethane foam and a polyester microfilter, a heat sink, and necessary electrical connections. After priming, the cartridge was tested on a test fixture and showed that the ink produced an average drop mass of 148 nanograms per drop (average of 128 jets). The ink cartridge containing the ink was placed in an ink jet printer (Texas Instruments MicroMarc) for printing tests. The ink was printed on several plain papers and yielded excellent print quality with high optical density and accurate ink placement with no poor directionality. The accomplishment of high optical density on plain papers indicates that the modified ink was jetted with an adequate ink drop volume (or drop mass) and spot size for complete pixel coverage. High ink drop velocity (or short transit time) allowed an accurate ink placement on the recording media. The average spot size on the Xerox® Image Series Smooth paper was about 130 microns. The optical density data of the ink on different plain papers are listed below: Xerox® Image Series LX paper: O.D.=1.31; Xerox® Image Series Smooth: O.D.=1.26; Gilbert Bond paper: O.D.=1.33; and Neenah Classic Laid paper: O.D.=1.28.

Other embodiments and modifications of the present invention may occur to those skilled in the art subsequent to a review of the information presented herein; these embodiments and modifications, as well as equivalents thereof, are also included within the scope of this invention.

What is claimed is:

1. A thermal ink jet printing process which comprises (a) incorporating into a thermal ink jet printer an ink composition comprising water, a dye, and pigment particles having an average particle diameter of from about 0.001 micron to about 10 microns, said pigment particles being present in the ink in an amount of less than 0.1 percent by weight; and (b) causing droplets of the ink to be ejected in an imagewise pattern onto a recording medium by selectively heating the ink in the printer in an imagewise pattern, thereby generating images on the recording medium.

2. A process according to claim 1 wherein the pigment particles have chemically bonded to the surfaces thereof a hydrophilic moiety.

3. A process according to claim 2 wherein the hydrophilic moiety is selected from the group consisting of sulfonic acid salts, phosphoric acid salts, carboxylic acid salts, and mixtures thereof.

4. A process according to claim 1 wherein the ink contains a humectant selected from the group consisting of ethylene glycol, propylene glycol, diethylene glycol, glycerine, dipropylene glycol, polyethylene glycols, polypropylene glycols, trimethylolpropane, aliphatic amides, cyclic amides, aromatic amides, ethers, amine derivatives, carboxylic acids, carboxylic acid salts, esters, alcohols, organosulfides, organosulfoxides, sulfones, alcohol derivatives, hydroxyether derivatives, cellusolves, amino alcohols, ketones, polyelectrolytes, urea derivatives, and mixtures thereof.

5. A process according to claim 1 wherein the ink contains an organic compound selected from the group consisting of N,N-dimethylformamide, N-methylpyrrolidone, 1-cyclohexyl-2-pyrrolidone, dialkyl glycolethers, monoalkyl glycolethers, morpholine, trimethylamine, triethylamine, dibutylamine, N,N-bis(3-aminopropyl) ethylenediamine, dialkylamines, piperidine, pyridine, 1-propanol, 1-butanol, benzyl alcohol, phenol derivatives, dimethyl sulfoxide, sulfolane, dialkylsulfones, 2-(2-butoxyethoxy)ethanol, 2-(2-ethoxyethoxy)ethanol, 2-(2-methoxyethoxy)ethanol, 2-(2-propoxyethoxy)ethanol), propylene glycol monomethyl ether, propylene glycol monoethyl ether, propylene glycol monobutyl ether, 2-butoxyethanol and 2-pentoxyethanol, diethanolamine, triethanolamine, and mixtures thereof.

6. A process according to claim 1 wherein the ink has a conductivity of less than about 0.007 $(ohm-cm)^{-1}$.

7. A process according to claim 1 wherein the dye is present in an amount of from about 0.5 to about 15 percent by weight of the ink.

8. A process according to claim 1 wherein the dye is present in an amount of from about 1 to about 6 percent by weight of the ink.

9. A process according to claim 1 wherein the dye is a water soluble anionic dye.

10. A process according to claim 1 wherein the dye is a water soluble cationic dye.

11. A process according to claim 1 wherein the pigment particles have an average particle diameter of about 3 microns or less.

12. A process according to claim 1 wherein the pigment particles are present in an amount of from about 0.0000001 to about 0.09 percent by weight.

13. A process according to claim 1 wherein the pigment particles are present in an amount of from about 0.0000001 to about 0.075 percent by weight.

14. A process according to claim 1 wherein the pigment particles comprise carbon black.

15. A process according to claim 1 wherein the ink also contains a dispersing agent.

16. A process according to claim 1 wherein the ink has a viscosity at room temperature of from about 1 to about 10 centipoise.

17. A process according to claim 1 wherein the ink has a surface tension at room temperature of from about 26 to about 72 dynes per centimeter.

18. A process according to claim 1 wherein the ink contains a dispersing agent selected from the group consisting of alkyl phenoxy poly(ethyleneoxy)ethanol derivatives, dialkyl phenoxy poly(ethyleneoxy)ethanol derivatives, copolymers of naphthalene sulfonic salts and formaldehyde, copolymers of styrene and maleic acid salts, polyacrylate derivatives, copolymers of acrylic monomers, copolymers of methacrylic monomers, salts of copolymers of acrylic monomers, salts of copolymers of methacrylic monomers, polystyrenesulfonate salts, and mixtures thereof.

19. An ink composition comprising water, a dye, and pigment particles having an average particle diameter of from about 0.001 micron to about 10 microns, said pigment particles being present in the ink in an amount of less than 0.1 percent by weight.

20. An ink composition according to claim 19 wherein the pigment particles are present in an amount of from about 0.0000001 to about 0.09 percent by weight.

21. A process according to claim 1 wherein the dye is selected from the group consisting of Food dyes, Acid dyes, Reactive dyes, monoazo dyes, disazo dyes, and mixtures thereof.

22. A process according to claim 1 wherein the ink also contains a dispersing agent, said dispersing agent being selected from the group consisting of anionic dispersing agents, cationic dispersing agents, amphoteric dispersing agents, and mixtures thereof.

23. A process according to claim 1 wherein the pigment particles are selected from the group consisting of black pigments, cyan pigments, magenta pigments, yellow pigments, red pigments, blue pigments, green pigments, brown pigments, and mixtures thereof.

* * * * *